P. W. PHILLIPS
Improvement in Curtain-Fixtures.

No. 114,036. Patented April 25, 1871.

Witnesses
O. C. Smith
J. K. Nichols

Inventor
P. W. Phillips
by his atty.
J. A. Bassett.

UNITED STATES PATENT OFFICE.

PHINEAS W. PHILLIPS, OF SALEM, MASSACHUSETTS, ASSIGNOR TO JAMES F. ALMY, OF SAME PLACE.

IMPROVEMENT IN CURTAIN-FIXTURES.

Specification forming part of Letters Patent No. 114,036, dated April 25, 1871.

I, PHINEAS W. PHILLIPS, of Salem, in the county of Essex and State of Massachusetts, have invented a new and useful Improvement in Curtain-Fixtures, of which the following is a specification:

The nature of my invention consists in arranging an automatic device to be used in connection with shade-rollers which are provided with a coiled spring, by which the shade is rolled up or balanced, so that when the roller is taken out of the brackets for any purpose the spring will be prevented from unwinding or running down.

Figure 1:
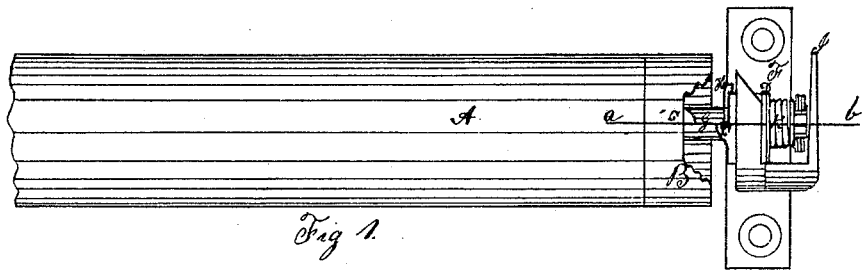
Figure 2:
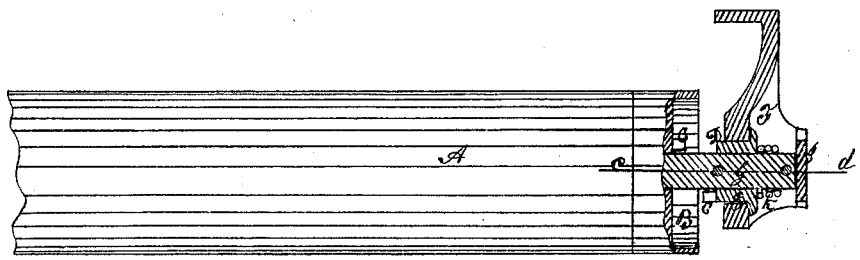
Figure 3:
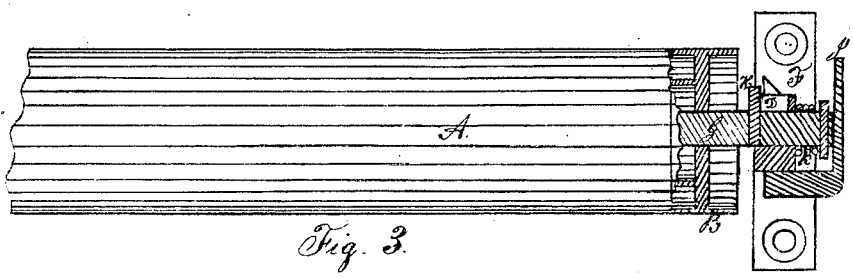

The drawing represents, in Figure 1, an elevation of the shade-roller and bracket. Fig. 2 represents a section on line $a\,b$ of Fig. 1. Fig. 3 represents a section on line $c\,d$ of Fig. 2.

Similar letters of reference indicate like parts in all the figures.

A represents the shade-roller. This roller has a cap or flange, B, made of metal. Together with the collar or block D it forms the clutch C.

D is a collar or block, which is retained in the slot E, formed on the bracket F. The shaft of the shade-roller G passes through the collar D. This collar has a slot, which retains the pin H. This pin passes through or is inserted in the shaft G. The slot allows a slight lateral movement of the collar D, and the pin H, in connection with the collar D, prevents the shaft G from revolving. The end of the shaft G is retained in position by the upright I, which forms a part of the bracket.

A spring, K, is coiled around the shaft G, between the upright I and the collar D, so that when the roller is taken out of the brackets the collar or block D is forced against the flange or cap B, engaging the clutch, holding the collar-shaft and shade-roller in the same position, and preventing the spring from being unwound.

The jaws of the slot E are inclined at the top, so as to guide the collar I into place between the jaws, thus releasing the clutch when the roller is put into the proper place in the bracket, and allowing the shade-roller to revolve.

The collar or block D is shown as being made square; but it may be made round, and the shaft may be held in a slot formed in the upright I, the end of the shaft being made square for the purpose, accomplishing the same result.

I claim as my invention—

A spring shade-roller having an automatic clutch, arranged and operating in the manner and for the purpose substantially as set forth and shown.

P. W. PHILLIPS.

Witnesses:
JOHN A. BASSETT,
WM. A. PERKINS.